United States Patent
Ueda et al.

(10) Patent No.: US 8,512,109 B2
(45) Date of Patent: Aug. 20, 2013

(54) WINDSHIELD SYSTEM FOR A SADDLE-TYPE VEHICLE

(75) Inventors: Yukiya Ueda, Saitama (JP); Haruomi Sugita, Saitama (JP); Yukinori Kurakawa, Saitama (JP); Hiroyuki Ozawa, Saitama (JP); Takefumi Okubo, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1521 days.

(21) Appl. No.: 11/503,829

(22) Filed: Aug. 14, 2006

(65) Prior Publication Data
US 2007/0066210 A1    Mar. 22, 2007

(30) Foreign Application Priority Data
Aug. 31, 2005  (JP) ................. 2005-252835

(51) Int. Cl.
*B60J 1/20*    (2006.01)
(52) U.S. Cl.
USPC .................................................... 454/130
(58) Field of Classification Search
USPC ......... 454/125, 122, 138, 130, 150; 296/78.1
See application file for complete search history.

(56) References Cited

U.S. PATENT DOCUMENTS

| | | | | |
|---|---|---|---|---|
| 1,020,336 A * | 3/1912 | White | ............................. | 296/91 |
| 1,712,154 A | 5/1929 | Mingo et al. | | |
| 1,846,434 A | 2/1932 | Osborne | | |
| 2,659,942 A | 11/1953 | Iverson | | |
| 3,146,019 A * | 8/1964 | Peyches | ..................... | 296/96.14 |
| 4,479,676 A * | 10/1984 | Hayes | .......................... | 296/78.1 |
| 4,498,700 A * | 2/1985 | Fujii et al. | ..................... | 296/78.1 |
| 4,715,465 A * | 12/1987 | Takahashi et al. | ............ | 180/225 |
| 4,793,293 A * | 12/1988 | Minami | ....................... | 123/41.7 |
| 4,830,135 A * | 5/1989 | Yamashita | .................... | 180/229 |
| 4,911,494 A * | 3/1990 | Imai et al. | .................... | 296/78.1 |
| 5,409,287 A * | 4/1995 | Suzuki | ....................... | 296/180.1 |
| 6,606,869 B2 | 8/2003 | Takahashi et al. | | |
| 6,676,283 B2 | 1/2004 | Ozawa et al. | | |
| 7,259,961 B2 * | 8/2007 | Lucero et al. | ................. | 361/695 |
| 7,261,358 B2 * | 8/2007 | Kurakawa et al. | .......... | 296/78.1 |

FOREIGN PATENT DOCUMENTS

| | | | |
|---|---|---|---|
| AU | 8412282 | | 1/1983 |
| AU | 8412282 A | * | 1/1983 |
| DE | 19520515 | | 12/1996 |
| GB | 2115356 | | 9/1983 |
| JP | 64-001671 | | 6/1989 |
| JP | 10-203454 | | 8/1998 |
| JP | 2002-284073 | | 10/2002 |

\* cited by examiner

*Primary Examiner* — Kang Hu
*Assistant Examiner* — Brittany E Towns
(74) *Attorney, Agent, or Firm* — Carrier Blackman & Associates, P.C.; William D. Blackman; Joseph P. Carrier

(57) ABSTRACT

The effect of a windshield for a saddle-type vehicle such as a low-slung type of motorcycle or three-wheeled vehicle is enhanced, and pressure is sufficiently adjusted in an open space at the back of the windshield using an inventive windshield system. The vehicle includes a leg shield in front of legs of a rider, and a step space rearward of the leg shield. The windshield system includes a windshield which is provided with an air outlet that opens upward. An air inlet provided at the front of the vehicle communicates with the air outlet other through a duct, and the air outlet opens to the upper center of the windshield. Pressure adjusting outlets, for adjusting pressure in a space around the rider by blowing air toward the step space, are provided separately from the air outlet.

3 Claims, 8 Drawing Sheets

PRIOR ART

PRIOR ART

WINDSHIELD SYSTEM FOR A SADDLE-TYPE VEHICLE

CROSS-REFERENCE TO RELATED APPLICATIONS

The present invention claims priority under 35 USC 119 based on Japanese patent application No. 2005-252835, filed on Aug. 31, 2005. The subject matter of this priority document is incorporated by reference herein.

BACKGROUND OF THE INVENTION

1. Field of the Invention

The present invention relates to a windshield system for a saddle-type vehicle, where the windshield has integrally formed air distribution structures.

2. Description of the Background Art

In a conventional windshield system for a saddle-type vehicle, air outlets are provided at both sides of an upper end of a windshield, an outside air stream is blown from these air outlets, and the shielding effect of the windshield is enhanced. Further, it is known to provide an outside air inlet and an air outlet on the right and on the left of the windshield, in order to reduce a difference in pressure between the inside and the outside of the windshield, by taking in air at the outside air inlet and blowing it from the air outlet. Such a windshield system is disclosed, for example, in Japanese published patent document JP 64-001671.

The figures of Japanese published patent document JP 64-001671 have been reproduced herein as FIGS. 9-20. Referring to FIGS. 9-12, these figures show that the effect of a windshield upon an upper half of an occupant is enhanced by: providing the windshield 202 at the front of a motorcycle 201; providing a transparent screen 422 on an upper part of the windshield 202; holding the screen 422 with an outside frame 213; providing right and left outside air inlets 216, 216 in a lower part of the outside frame 213; configuring these outside air inlets 216, 216 to communicate with air outlets 217, 217 provided on an upper part of the outside frame 213 through air ducts 215, 215; and blowing out an outside air stream, taken from the outside air inlets 216, 216, outwardly via the air outlets 217, 217.

Referring to FIGS. 13-16, these figures show that outside air inlets 326, 326 are provided on the right and on the left of a lower part of the windshield 202, air outlets 317, 317 are provided on the rear sides of the windshield 202, and that the outside air inlet 326 and the air outlet 317 communicate with each other through a duct 322. During operation of this prior art system, an outside air stream is prevented from swirling to the inside of the windshield 202, and a difference in pressure between the outside and the inside of the windshield 202 is reduced.

Referring to FIGS. 17-20, it is described that an opening 501 is provided between a windshield 502 and a fender 500, and an outside air stream W50 is taken inside the windshield 502 utilizing the opening 501, the outside air stream W50 is led inside the windshield 502 via guides 521, 531, 541, 532, 551 and a difference in pressure between the outside and the inside of the windshield 502 is reduced.

In the windshield system disclosed in Japanese published patent document JP 64-001671, since the outside air stream W2 is blown out from the air outlets 217, 217 provided on the right and on the left of the upper part of the outside frame 213 as shown in FIG. 9, and the outside air stream W2 is not blown out from the upside of the screen 422, a traveling air stream passing over the top of the screen 422 directly hits a rider, and the effect of the windshield is not sufficient.

In addition, the air outlet 317 shown in FIG. 14 is opened outside the body, the air outlet shown in FIGS. 18 and 20 leads air stream inside the windshield 502, and is provided to reduce a difference in pressure between the outside and the inside of the windshield so as to reduce running resistance.

However, as a result of recent analysis, when a structure is adopted in which air is blown from a windshield to acquire the effect of a screen, it is known that the pressure difference reduction only in the vicinity of the windshield is not sufficient from the viewpoint of not only the reduction of running resistance but the reduction of noise about a rider's ears. This is particularly true in a large, low-slung type of vehicle, in which a space in front of the rider and around the rider is large.

It is an object of the present invention to enhance the wind-diverting effect of a windshield, and to sufficiently adjust pressure in an open space at the back of the windshield.

SUMMARY

A first aspect of the invention is based upon a windshield system for a saddle-type vehicle such as a low-slung type of motorcycle or three-wheeled vehicle, where a windshield of the saddle-type vehicle has a leg shield in front of a rider's legs and a step space behind the leg shield. The windshield system is provided with an air outlet that opens upward, and a main air outlet and an air inlet, provided at the front of the vehicle, communicate with each other through a duct. The invention is characterized in that the main air outlet opens to an upper central section of the windshield, and that a secondary outlet is provided, separate from the main air outlet, for adjusting pressure in a space around a rider by blowing out air toward the step space.

Air is taken in through the air inlet provided at the front of the windshield into the duct, and the air is blown from the air outlet, which opens upward in the upper central portion of the windshield, whereby a direction of traveling air stream flowing from the front side of the body toward an occupant on the upside of the windshield is changed substantially upward, and the traveling air stream that hits the occupant is reduced.

In addition, since the secondary air outlet is provided for adjusting pressure in the space around the rider by blowing air toward the step space in the saddle-type vehicle such as a low-slung type of motorcycle or three-wheeled vehicle, a difference in pressure between the relatively large space in front of the rider and the outside of the windshield can be rectified, and noise about the rider's ears can be reduced.

A second aspect of the invention is characterized in that the secondary air outlet, for adjusting pressure, is provided at the rear side of a leg shield.

The pressure adjusting air outlet for blowing air toward a step space can be efficiently provided by providing the air outlet for adjusting pressure at the rear side of the leg shield and blowing air toward the space around an occupant's legs.

A third aspect of the invention is characterized in that an air outlet opens to the upper center of a windshield, and an air outlet for adjusting pressure in a space around the rider by blowing air toward the rear of the occupant is provided separately from the air outlet.

Pressure in a space at the rear of the occupant, which is caused to be in a low-pressure state by the windshield and the occupant, is adjusted by directing the air outlet for adjusting pressure and blowing air into the space at the rear of the occupant.

A fourth aspect of the invention is characterized in that a second air outlet is provided for adjusting pressure in a space around the rider by blowing air toward the space at the rear of the occupant, and the second air outlet is provided separately from the air outlet for adjusting pressure.

Pressure in a space at the rear of the occupant, which is caused to be in a low-pressure state by the windshield and the occupant, is adjusted by directing the second air outlet for adjusting pressure and blowing air into the space at the rear of the occupant.

According to the first aspect of the invention, the air outlet opens to the upper center of the windshield, and the air outlet for adjusting pressure in the space around the rider by blowing air toward the step space is provided separately from the air outlet. As a result, air is taken from the air inlet provided to the front of the windshield into the duct, the air is blown from the air outlet opened upward in the upper center of the windshield, a direction of traveling air stream flowing from the front side of the body toward the occupant on the upside of the windshield is changed substantially upward, and traveling air stream that hits the occupant is reduced.

In addition, since the air outlet for adjusting pressure in the space around the rider by blowing air toward the step space in the saddle-type vehicle such as a low-slung type of motorcycle or three-wheeled vehicle is provided, a difference in pressure between the relatively large space in front of the rider and the outside of the windshield can be rectified and noise about the rider's ears can be reduced.

According to the second aspect of the invention, the air outlet for adjusting pressure is provided at the rear of the leg shield. As a result, the air outlet for adjusting pressure by blowing air toward the step space can be efficiently provided by providing the air outlet for adjusting pressure at the rear of the leg shield and blowing air toward the space around the occupant's legs.

According to the third aspect of the invention, the air outlet is opened to the upper center of the windshield and the air outlet for adjusting pressure in the space around the rider by blowing air toward the back of the occupant is provided separately from the air outlet. As a result, pressure caused to be in a low-pressure state by the windshield and the occupant in the space at the back of the occupant can be adjusted by directing the air outlet for adjusting pressure toward the back of the occupant and blowing air toward the space at the back of the occupant.

According to the fourth aspect of the invention, the second air outlet for adjusting pressure in the space around the rider by blowing air toward the space at the back of the occupant is provided separately from the air outlet for adjusting pressure. As a result, pressure caused to be in a low-pressure state by the windshield and the occupant in the space at the back of the occupant can be adjusted by directing the second air outlet for adjusting pressure toward the back of the occupant and blowing air toward the space at the back of the occupant.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

DETAILED DESCRIPTION

Figure 1:
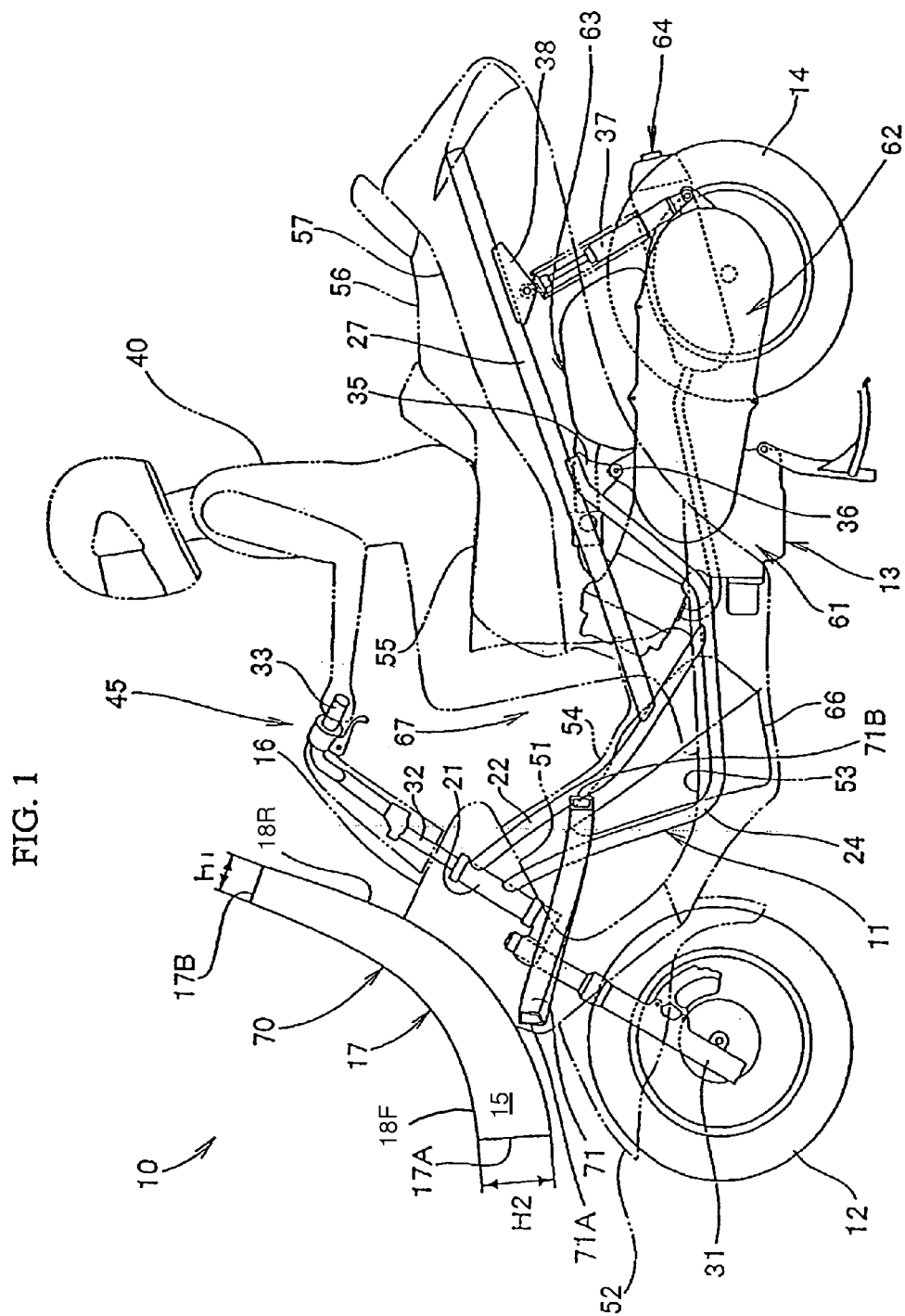
FIG. 1 is a side view showing a motorcycle as an example of a saddle-type vehicle, the vehicle provided with a first embodiment of a windshield system according to the invention.

Selected illustrative embodiments of the invention will now be described in some detail, with reference to the drawings. It should be understood that only structures considered necessary for clarifying the present invention are described herein. Other conventional structures, and those of ancillary and auxiliary components of the system, are assumed to be known and understood by those skilled in the art. The drawings shall be viewed in a direction of reference numerals.

FIG. 1 is a side view of a saddle-type vehicle provided with a windshield system according to a first embodiment of the invention. The saddle-type vehicle 10 is, for example, a scooter-type motorcycle. In motorcycle 10, a front wheel 12 is suspended from the front of a body frame 11 so that the front wheel can be steered, a power unit 13 is attached to the center of the body frame 11 in a vertically swingable manner, a rear wheel 14 is attached to the rear end of the power unit 13 and a windshield 17 member is attached to the front of a front cover 16 provided to the front of the body. The windshield member 17 functions as a windshield for the vehicle, and for purposes of simplicity and brevity, the windshield member 17 will also, alternatively, be referred to as a windshield 17 elsewhere in this specification.

The body frame 11 includes: a head pipe 21 provided on its front end; a pair of left and right front upper frames 22, 23 (only the reference numeral 22 on this side is shown) extending backward and diagonally downward from the head pipe 21; a pair of left and right front lower frames 24, 25 (only the reference numeral 24 on this side is shown) in a substantial U-shape in a side view; and a pair of left and right rear frames 27, 28 (only the reference numeral 27 on this side is shown) which extend backward and diagonally upward from halfway parts of the front upper frames 22, 23 and respective intermediate parts of which are coupled to rear ends of the front lower frames 24, 25.

The head pipe 21 supports a front fork 31 so that the front fork can be steered, the front wheel 12 is attached to a lower end of the front fork 31, and handlebars 33 are attached to an upper end of a steering shaft 32 of the front fork 31.

A supporting bracket 35 is attached to a lower part in the substantial center of each rear frame 27, 28, and the power unit 13 is swingably attached to the left and right unit supporting brackets 35, 35 (only the reference numeral 35 on this side is shown) via a spindle 36. A reference numeral 37 denotes a rear shock absorber unit attached between the rear end of the power unit 13 and a bracket 38. The bracket 38 is fixed on the side of the rear frame 27.

Figure 6:
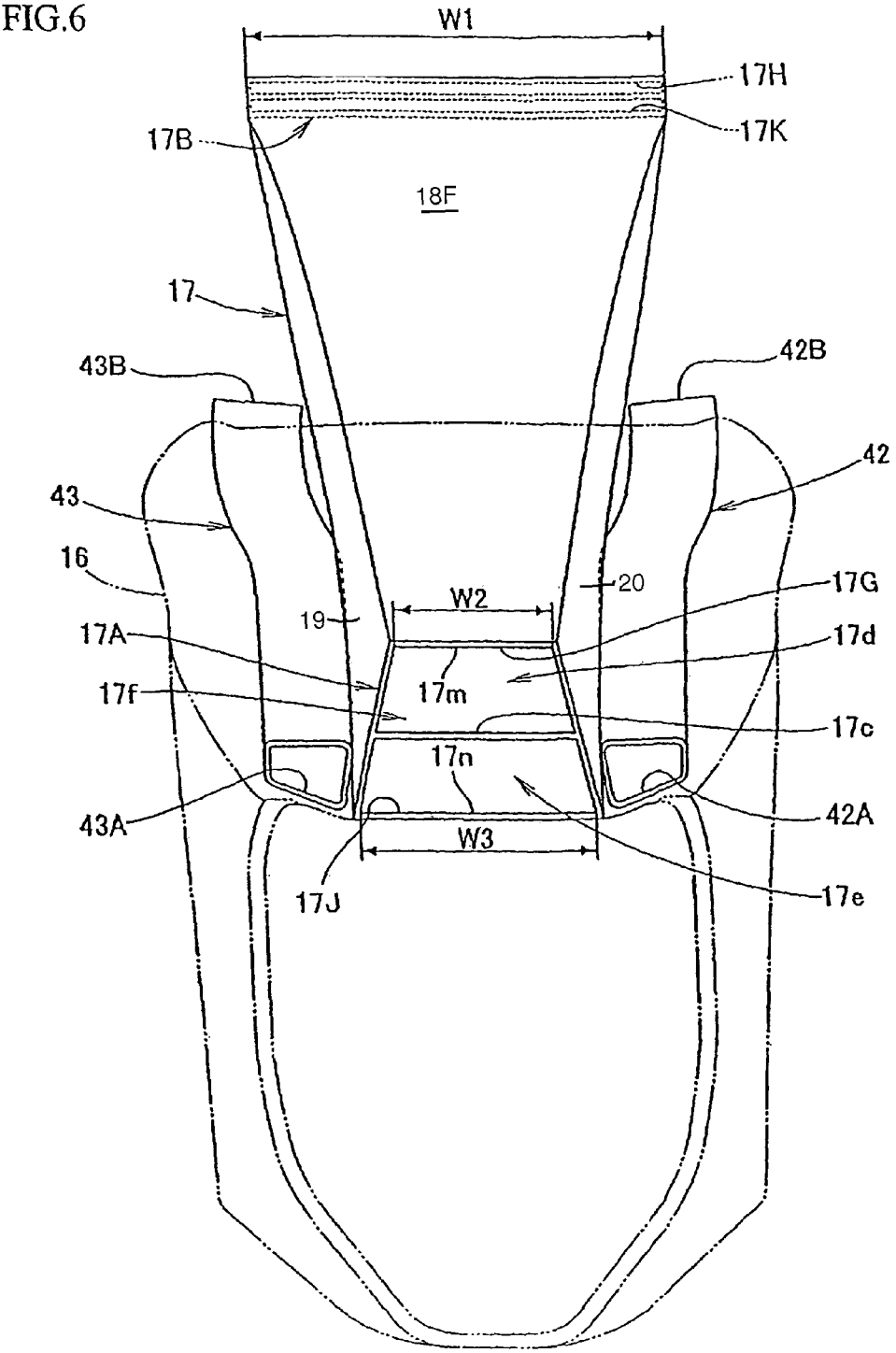
FIG. 6 is a front view of the vehicle of FIG. 5, showing the configuration of the front cover and windshield.
Figure 7:
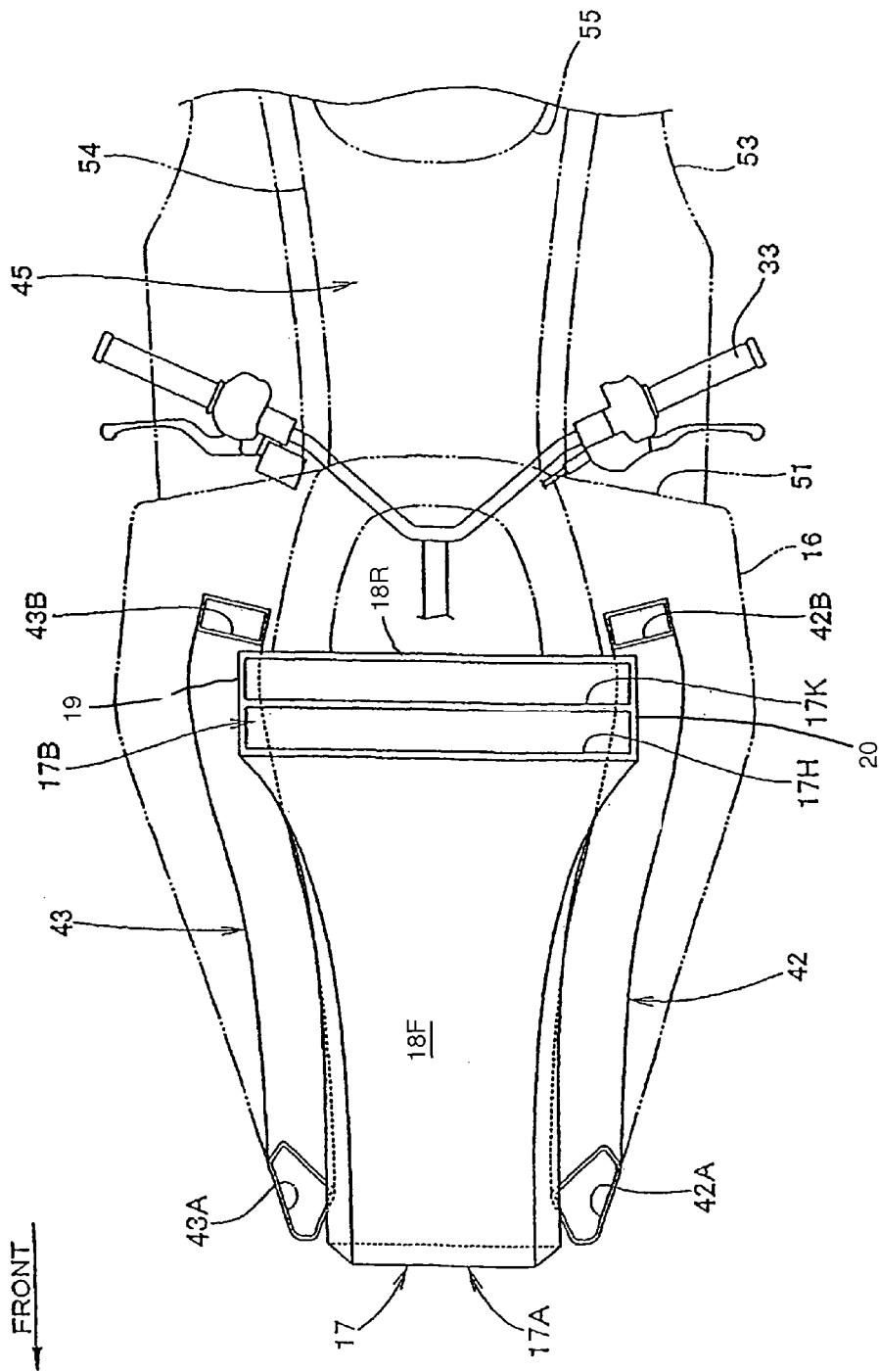
FIG. 7 is a top plan view of the vehicle of FIG. 5, showing the configuration of the windshield and the air ducts, and in which an arrow labeled "front" indicates the forward direction of the vehicle.

In side view, in the depicted embodiment, the windshield 17 member is a hollow, substantially J-type transparent member having a windshield duct 15 formed integrally therein and extending between an air inlet 17A and an air outlet 17B. The windshield member 17 is provided on the front of the front cover 16. The windshield member 17 includes an arcuate front panel portion 18F and an arcuate rear panel portion 18R spaced apart from and operatively attached to the front panel portion. As shown in FIG. 1, each of the arcuate front and rear panel portions 18F, 18R defines a curved concave shape as viewed from the side. These spaced-apart panel portions 18F, 18R cooperate to define a windshield for the vehicle 10. The windshield member 17 also includes a right sidewall 19 interconnecting the front and rear panel portions 18F, 18R on the right side of the windshield member, and a left sidewall 20 interconnecting the front and rear panel portions on the right side of the windshield member, as shown in FIGS. 6 and 7. While the saddle-type vehicle 10 is driven, air is taken inside the windshield duct 15 from an air inlet 17A provided to a front end of the windshield member 17. As discharged from the windshield duct 15, air is blown substantially upward from an air outlet 17B provided to an upper end of the windshield member 17. In this manner, the course of traveling air stream toward a rider 40 from the front side of the vehicle is curved gradually and changed to an upward direction by the arcuate shape of the windshield duct 15, whereby the traveling air stream that hits an upper half of the rider 40, is reduced as well as the air pressure.

A pair of left and right ducts 71, 72 (only the reference numeral 71 on this side is shown) are provided at the front cover 16 at the rear of the windshield 17 for adjusting pressure. These ducts 71, 72 may also be referred to as auxiliary air duct tubes, as they are provided in addition to, and separate from the windshield duct 15 of the windshield member 17.

The pressure adjusting ducts 71, 72 are provided with air inlets 71A, 72A (only the reference numeral 71A on this side is shown) in the front of the front cover 16, and are provided with air outlets 71B, 72B (only the reference numeral 71B on this side is shown) in an upper part of a center cover 54 at the rear of a leg shield 51. As shown in FIG. 1, the air inlets 71A, 72A of the auxiliary air duct tubes 71, 72 are disposed proximate to, and rearward of the windshield air inlet 17A.

The windshield 17 and the ducts 71, 72 are provided for adjusting pressure associated with the windshield system 70.

When the windshield 17 is provided on the vehicle, air pressure on the rider 40 is reduced and wind noise is reduced while the vehicle is driven. However, pressure decreases in a space 45 between the windshield 17 and the occupant, compared with its vicinity, and noise about the rider's ears caused by a vortex in the traveling air stream increases. Since the ducts 71, 72 for adjusting pressure are provided together with the windshield 17 in the invention, pressure in the space 45 is increased by supplying air to the space 45, at the rear of the leg shield 51, particularly to a step space 67 forming the space 45 and its vicinity. A difference in pressure between the rear side of the windshield 17 and its vicinity is reduced, and the noise about the rider's ears is reduced, as a result of the effect of the pressure adjusting ducts 71, 72.

The reference numeral 51 in FIG. 1 denotes the leg shield provided at the back of the front cover 16 and in front of legs (particularly, parts under knees) of the rider 40. The motorcycle 10 also includes a front fender 52, a step floor 53 for the rider 40 to put his/her feet, the center cover 54, an operator's seat 55, a pillion seat 56, a body cover 57, an engine 61 and a continuously variable transmission 62 respectively forming the power unit 13, an intake system 63 connected to an upper part of the engine 61, an exhaust system 64 connected to a lower part of the engine 61, a fuel tank 66, and the step space 67 encircled by the leg shield 51, the center cover 54 and the operator's seat 55.

Next, the action of the windshield system 70 will be described.

Figure 2:
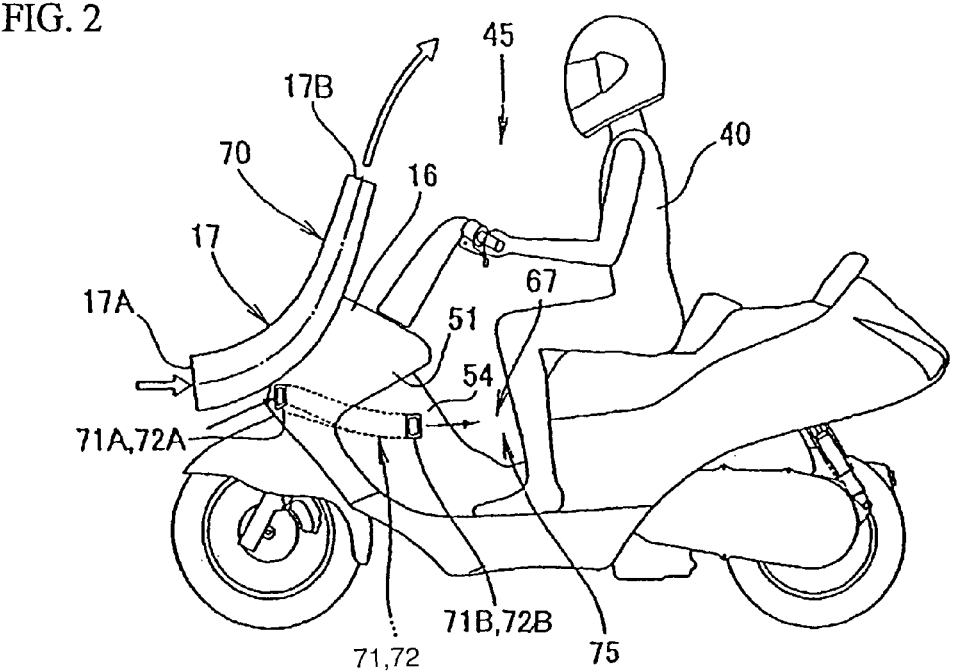
FIG. 2 shows the action of the windshield system of FIG. 1 according to a first embodiment the invention.

FIG. 2 shows the action of the windshield system 70 according to the first embodiment of the invention.

While the saddle-type vehicle is driven, air pressure which the rider 40 receives is reduced by the wind-redirecting effect of the windshield 17 as shown by open arrows in the figure. In addition, pressure in the space 45 at the rear of the windshield 17, particularly the pressure in a space 75 in front of the legs (specifically the parts under the knees) of the rider forming the lower portion of the space 45, is increased from a low-pressure state by taking air from the inlets 71A, 72A of the pressure adjusting ducts 71, 72 and blowing the air from the air outlets 71B, 72B as shown by a solid arrow in the figure. As a result, the difference in pressure with the vicinity of the windshield is reduced, a swirl of air into the space 75 is inhibited, and the noise about the ears of the rider 40 is reduced.

Figure 3:
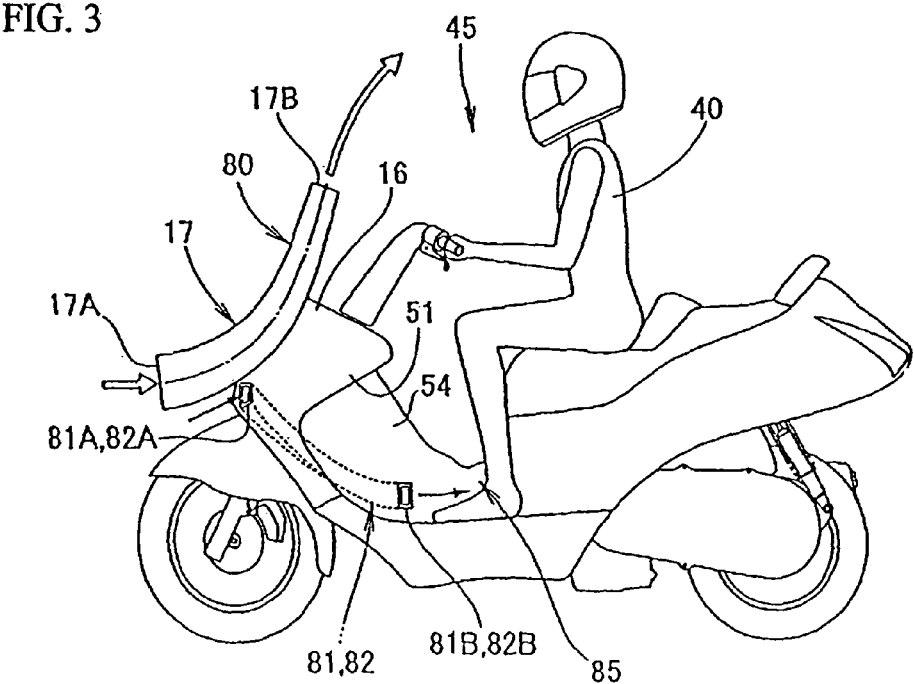
FIG. 3 is a side view of a motorcycle showing a second embodiment of a windshield system according to the invention.

FIG. 3 is a side view of a windshield system 80 according to second embodiment of the invention. In this and subsequent embodiments, elements which are common among the embodiments are provided with common reference numbers, and the description thereof is omitted.

The windshield system 80 of a saddle-type vehicle includes a windshield 17 and a pair of left and right pressure adjusting ducts 81, 82.

The pressure adjusting ducts 81, 82 are provided with air inlets 81A, 82A disposed in the front of a front cover 16, and are provided with air outlets 81B, 82B formed in a lower part of a center cover 54 at the rear of a leg shield 51.

While the saddle-type vehicle is driven, air pressure which the rider 40 receives is reduced by the wind-redirecting effect of the windshield 17 as shown by open arrows in the figure. In addition, pressure in a space 45 at the rear of the windshield 17, and particularly the air pressure in a space 85 at the rider's feet forming the lower portion of the space 45, is increased from a low-pressure state by taking air from the inlets 81A, 82A of the pressure adjusting ducts 81, 82 and blowing the air from the outlets 81B, 82B as shown by the solid arrows in the figure. As a result, a difference in pressure is reduced in the vicinity of the windshield, a swirl of air into the space 85 is inhibited, and noise about ears of the rider 40 is reduced.

Figure 4:
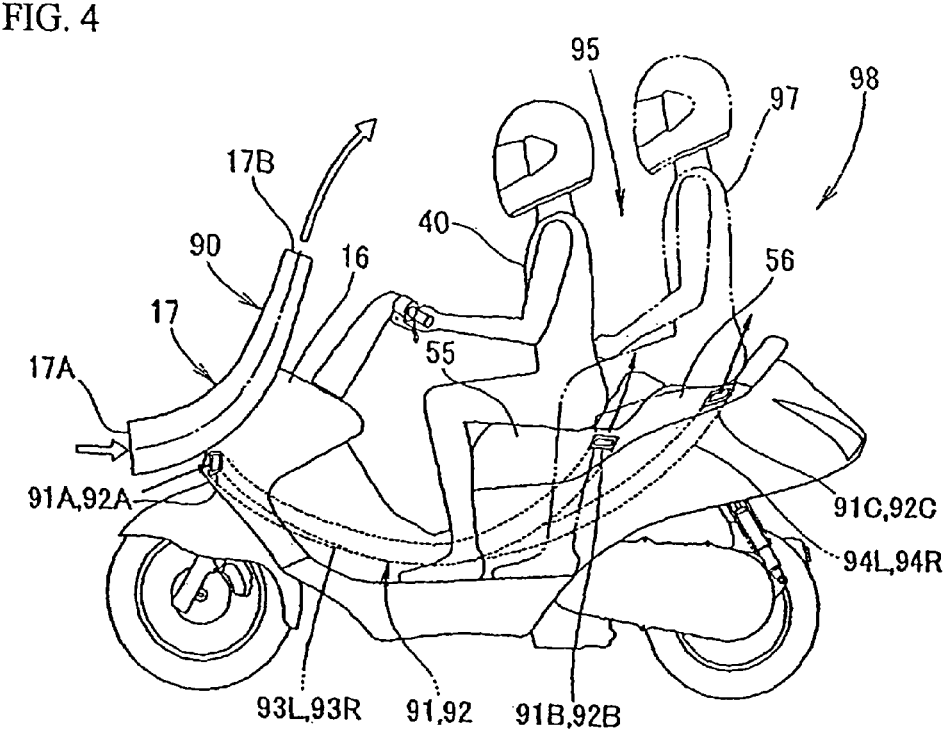
FIG. 4 is a side view of a motorcycle showing a third embodiment of a windshield system according to the invention.

FIG. 4 is a side view of a windshield system 90 according to a third embodiment of the invention.

The windshield system 90 of a saddle-type vehicle includes a windshield 17 and a pair of left and right pressure adjusting ducts 91, 92.

The duct 91 for adjusting pressure includes a left main duct 93L which branches to include a left subduct 94L connected to a middle of the left main duct 93L. The left main duct 93L is provided with an air inlet 91A disposed in the front of a front cover 16, and is provided with an air outlet 91B formed on the rear side of the operator's seat 55. The left subduct 94L communicates with the middle of the left main duct 93 L, and is provided with an air outlet 91C formed on the rear side of a pillion seat 56.

Though the following are not shown in FIG. 4, like the pressure adjusting duct 91, the pressure adjusting duct 92 includes a right main duct 93R and a right subduct 94R connected to a middle of the right main duct 93R. The right main duct 93R is provided with an air inlet 92A disposed in the front of the front cover 16, and is provided with an air outlet 92B formed on the rear side of the operator's seat 55. The right subduct 94R communicates with the middle of the right main duct 93R, and is provided with an air outlet 92C formed on the rear side of the pillion seat 56.

While the saddle-type vehicle is driven, air pressure which the rider 40 receives is reduced by the wind-redirecting effect of the windshield 17 as shown by open arrows in the figure. In addition, pressure in space 95 at the back of the rider 40 is increased from a low-pressure state by taking air from the inlets 91A, 92A of the ducts 91, 92 for adjusting pressure, and blowing the air from the outlets 91B, 92B, as shown by the solid arrows in the figure. As a result, difference in pressure is reduced in its vicinity, a swirl of air into the space 95 is inhibited, and noise about ears of the rider 40 is reduced.

When a pillion passenger 97 rides, a blowing of air from the outlets 91B, 92B is stopped. Instead, air is blown from the outlets 91C, 92C, pressure in a space 98 at the back of the pillion passenger 97 is increased from a low-pressure state, a difference in pressure with its vicinity is reduced, a swirl of air into the space 98 is inhibited, and noise about ears of the rider 40 and the pillion passenger 97 is reduced.

Figure 5:
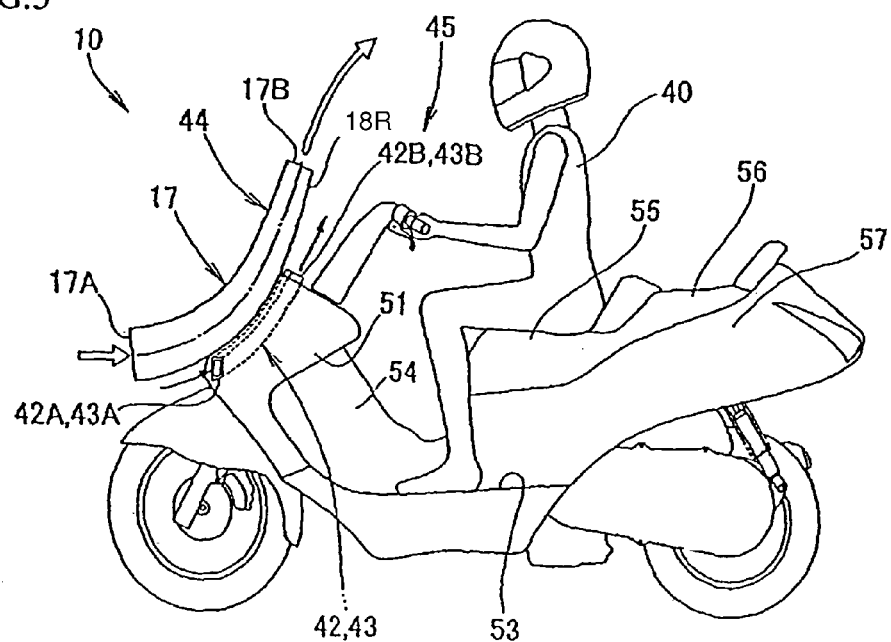
FIG. 5 is a side view of a motorcycle showing a fourth embodiment of a windshield system according to the invention.

FIG. 5 is a side view of a windshield system 44 according to a fourth embodiment of the invention.

The windshield system 44 of a saddle-type vehicle includes a windshield 17 and a pair of left and right pressure adjusting ducts 42, 43.

The pressure adjusting ducts 42, 43 are formed in shapes which substantially extend along the back panel portion 18R of the windshield 17, are provided with air inlets 42A, 43A at the lower, front ends thereof, and are provided with air outlets 42B, 43B at their upper, rear ends.

While the saddle-type vehicle 10 is driven, air pressure which a rider 40 receives is reduced: by taking air in the windshield 17 from an air inlet 17A provided to the windshield 17 of the windshield system 44; and by blowing the air substantially upward from an air outlet 17B, as shown by the open arrows in the figure.

Further, pressure in the space 45 at the rear of the windshield 17 is increased from a low-pressure state by taking air from the inlets 42A, 43A of the pressure adjusting ducts 42, 43, and blowing the air from the outlets 42B, 43B, as shown by solid arrows in the figures. As a result, a difference in pressure with its vicinity is reduced, a swirl of air into the space 45 is inhibited, and noise about ears of the rider 40 is reduced.

FIG. 6 is a front view of the saddle-type vehicle according to the fourth embodiment of the invention, showing the windshield 17 including an upper duct 17d and a lower duct 17e. The upper duct 17d and lower duct 17e are formed by providing the air inlet 17A in a shape of a trapezoid, and providing a partition 17c in the vertical substantial center. The upper duct 17d and the lower duct 17e form a duct part 17f.

The upper duct 17d is provided with an upper inlet 17G at its front, lower end, and is provided with an upper outlet 17H at its rear, upper end. The lower duct 17e is provided with a lower inlet 17J at its front, lower end and is provided with a lower outlet 17K at its rear, upper end. The upper inlet 17G and the lower inlet 17J form the air inlet 17A, and the upper outlet 17H and the lower outlet 17K form the air outlet 17B.

The width W1 of the air outlet 17B is larger than the width W2 of an upper side 17m and the width W3 of a lower side 17n for example of the air inlet 17A, the height H1 (see FIG. 1) of the air outlet 17B is smaller than the height H2 (see FIG. 1) of the air inlet 17A, and the cross-sectional area of the air outlet 17B is smaller than the cross-sectional area of the air inlet 17A.

Therefore, the flow velocity of air taken in the air inlet 17A is increased in the windshield 17 and can be blown from the air outlet 17B, further, air can be blown in a wide range by flattening the air outlet 17B, and windshield effect can be enhanced.

The inlets 42A, 43A of the pressure adjusting ducts 42, 43 are substantially quadrangular openings located at the substantially same height outside the lower inlet 17J of the windshield 17.

FIG. 7 is a top plan view of the front end of the saddle-type vehicle according to the fourth embodiment of the invention. The pressure adjusting ducts 42, 43 extend substantially linearly in the rearward direction of the vehicle from the sides of the inlets 42A, 43A to the sides of the outlets 42B, 43B, are directed inwardly toward the centerline of the vehicle body in the vicinity of each of the outlets 42B, 43B, and blow air inside the body. Therefore, pressure in the space 45 (that is, the open space in which the occupant rides) behind the windshield 17 can be effectively adjusted.

Figure 8:
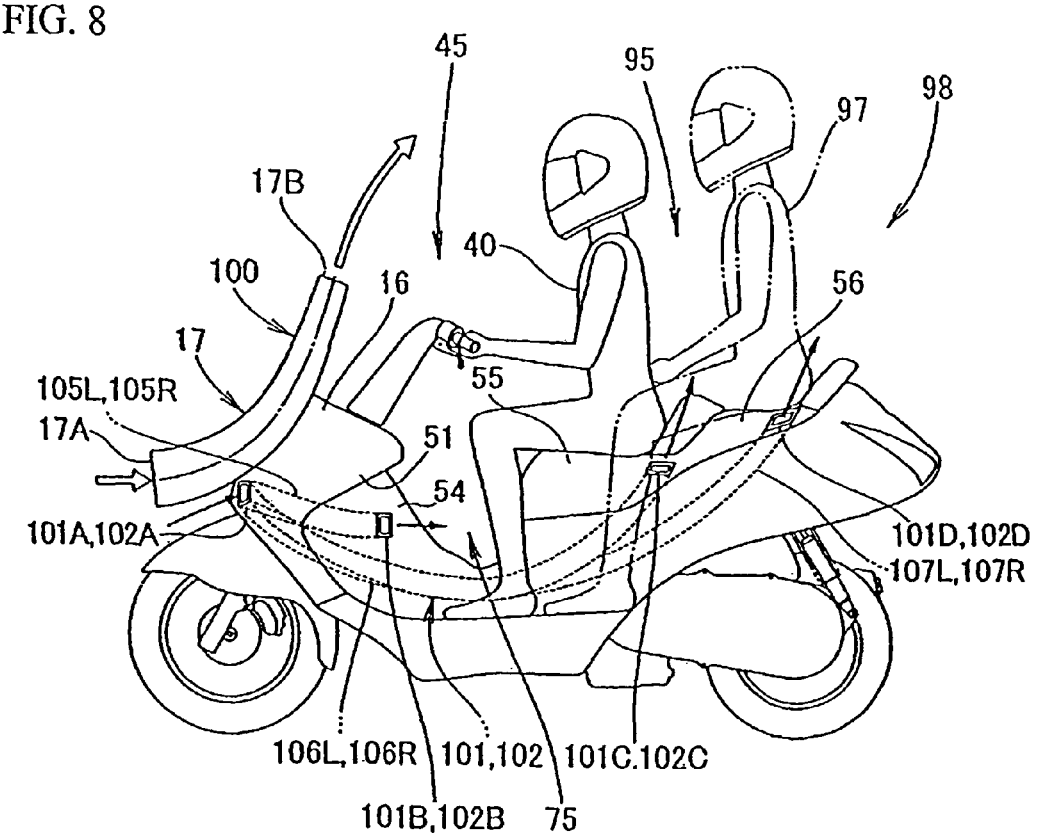
FIG. 8 is a side view of a motorcycle showing a fifth embodiment of a windshield system according to the invention.
Figure 9:
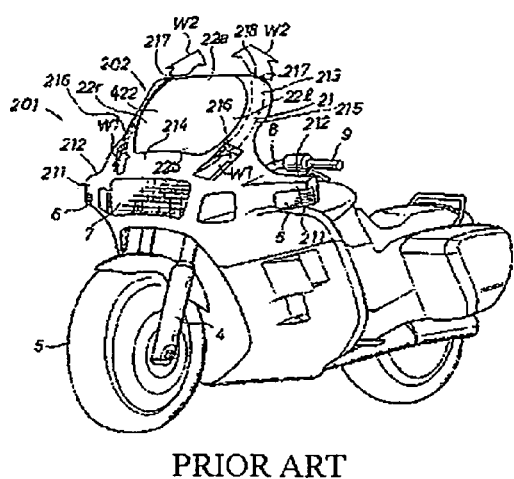
FIG. 9 is a front perspective view of a motorcycle showing a prior art windshield system.
Figure 10:
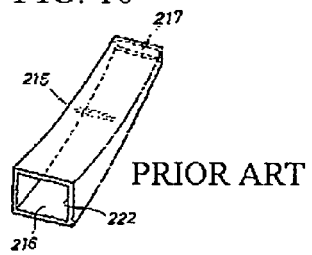
FIG. 10 is a perspective view of an isolated air duct of the windshield system of FIG. 9.
Figure 11:
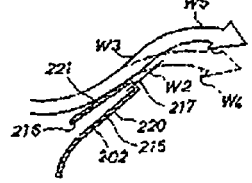
FIG. 11 is a partial side sectional view of an air duct of FIG. 9.
Figure 12:
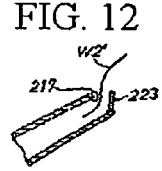
FIG. 12 is a partial side sectional view of an air duct of FIG. 9.
Figure 13:
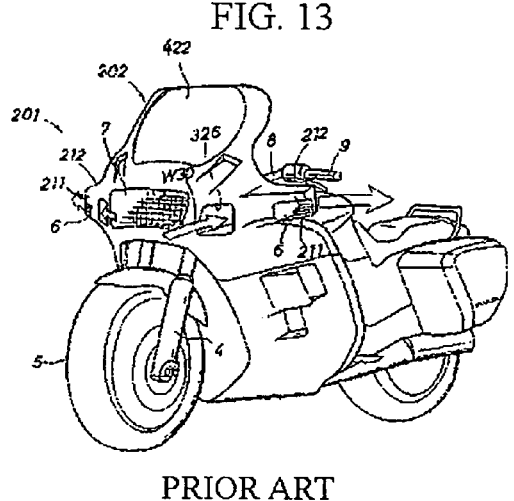
FIG. 13 is a front perspective view of a motorcycle showing an alternative prior art windshield system.
Figure 14:
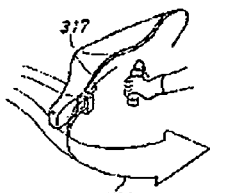
FIG. 14 is a rear perspective view of the prior art windshield system of FIG. 13.
Figure 15:
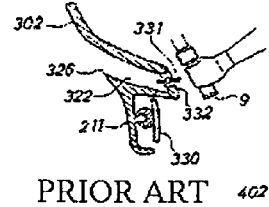
FIG. 15 is a partial side sectional view of an air duct of FIG. 13.
Figure 16:
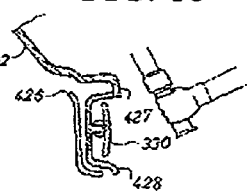
FIG. 16 is a partial side sectional view of an air duct of FIG. 13.
Figure 17:
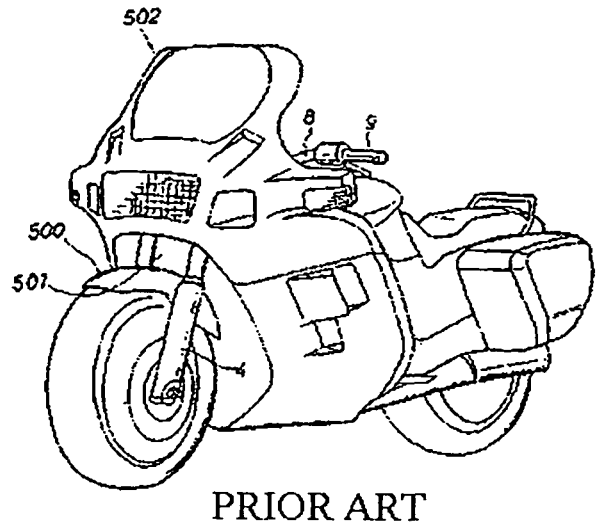
FIG. 17 is a front perspective view of a motorcycle showing a second alternative prior art windshield system.
Figure 18:
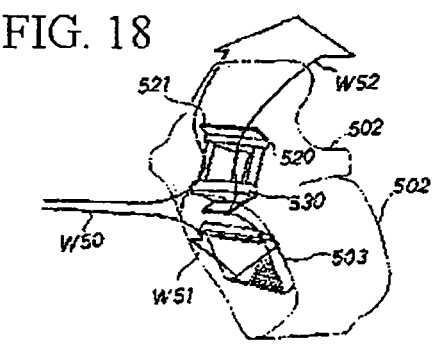
FIG. 18 is an isolated front perspective view of the windshield system of FIG. 17.
Figure 19:
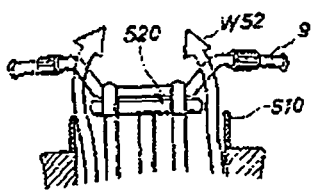
FIG. 19 is an isolated front view of the steering system of the motorcycle of FIG. 17.
Figure 20:
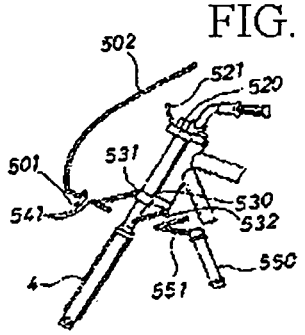
FIG. 20 is an isolated side view of the steering system of the motorcycle of FIG. 17.

FIG. 8 is a side view of a windshield system 100 according to a fifth embodiment of the invention.

The windshield system 100 of a saddle-type vehicle includes a windshield 17 and a pair of left and right pressure adjusting ducts 101, 102.

The pressure adjusting duct 101 includes a left first duct 105L having an air inlet 101A provided at the front of a front cover 16 and an air outlet 101B provided at an upper part of a center cover 54 at the rear of a leg shield 51. The pressure adjusting duct 101 also includes a left second duct 106L having the air inlet 101A provided at the front of the front cover 16 and an air outlet 101C provided at the rear side of an operator's seat 55, and a left third duct 107L. One end of the left third duct 107L is connected to an intermediate part of the left second duct 106L, and the other end is provided with an air outlet 101D disposed on the rear side of a pillion seat 56.

The pressure adjusting duct 102 a right first duct 105R having an air inlet 102A provided at the front of the front cover 16 and an air outlet 102B provided at the upper part of the center cover 54 at the rear of the leg shield 51. The pressure adjusting duct 102 also includes a right second duct 106R having the air inlet 102A provided at the front of the front cover 16 and an air outlet 102C provided at the rear side of the operator's seat 55, and a right third duct 107R. One end of the right third duct 107R is connected to an intermediate part of the right second duct 106R and the other end is provided with an air outlet 102D disposed on the rear side of the pillion seat 56.

While the saddle-type vehicle is driven, air pressure which the rider 40 receives is reduced by the wind-redirecting effect of the windshield 17 as shown by open arrows in the figure. In addition, pressure in the space 45 behind the windshield 17, particularly the air pressure in the space 75 in front of legs of the rider (specifically, parts under his/her knees) forming the lower portion of the space 45 at the rear of the leg shield 51 is increased from a low-pressure state by taking air from the inlets 101A, 102A of the pressure adjusting ducts 101, 102, and blowing the air from the outlets 101B, 102B, as shown by the open arrows. As a result, a difference in pressure with its vicinity is reduced, a swirl of air into the space 75 is inhibited, and noise about ears of the rider 40 is reduced.

In addition, while the saddle-type vehicle is driven, air pressure which the rider 40 receives is reduced by the windshield 17, and pressure in the space 95 at the back of the rider 40 is increased from a low-pressure state by taking air from the inlets 101A, 102A of the pressure adjusting ducts 101, 102 and blowing the air from the outlets 101C, 102C, as shown by the solid arrows. As a result, a difference in pressure with its vicinity is reduced, a swirl of air into the space 95 is inhibited, and noise about the ears of the rider 40 is reduced.

When a pillion passenger 97 rides, the blowing of air from the outlets 101C, 102C is stopped. Instead, air is blown from the outlets 101D, 102D, pressure in the space 98 at the back of the pillion passenger 97 is increased from a low-pressure state, a difference in pressure with its vicinity is reduced, a swirl of air into the space 98 is inhibited, and noise about ears of the rider 40 and the pillion passenger 97 is reduced.

As described in relation to FIGS. 1 and 2, the invention is first based upon the windshield system 70 of the saddle-type vehicle 10 such as a low-slung type of motorcycle or a three-wheeled vehicle. In such a vehicle, which includes the leg shield 51 in front of legs of the rider 40 and has the step space 67 at the back of the leg shield 51, the windshield 17 is provided with the air outlet 17B which opens upward. The air outlet 17B and the air inlet 17A, provided at the front of the vehicle, communicate with each other through a duct 17f. The invention is characterized in that the air outlet 17B opens at the upper center of the windshield 17, and the pressure adjusting outlets 71B, 72B, which permit adjustment of pressure in the space 45 around the rider 40 by blowing air toward the step space 67, are provided separately from the air outlet 17B.

Air is taken in the duct 17f from the air inlet 17A provided to the front of the windshield 17, the air is blown from the air outlet 17B, which opens upward in the upper center of the windshield 17, a direction of traveling air stream flowing from the front side of the vehicle body toward the rider 40 as an occupant toward the upper portion of the windshield 17 is changed substantially upward, and the traveling air stream that hits the rider 40 is reduced.

In addition, air is blown toward the step space 67 of the saddle-type vehicle 10 such as a low-slung type of motorcycle or three-wheeled vehicle, and the pressure adjusting outlets 71B, 72B for adjusting pressure in the space 45 around the rider 40 are provided. As a result, a difference in pressure between the relatively large space 45 in front of the rider 40 and the outside of the windshield 17 can be rectified and noise about the rider's ears can be reduced.

The invention is second characterized in that the pressure adjusting outlets 71B, 72B are provided rearward of the leg shield 51.

The pressure adjusting outlets 71B, 72B are provided at the rear of the leg shield 51, and thus the pressure adjusting outlets 71B, 72B for blowing air toward the step space 67 by blowing air toward the space 45 around the rider's legs can be efficiently provided.

The invention is third characterized in that as shown in FIG. 4, the air outlet 17B opens to the upper center of the windshield 17, and the pressure adjusting outlets 91B, 92B, 91C, 92C for adjusting pressure in the spaces 95, 98 around the occupant by blowing air toward the back of the occupant (rider 40, pillion passenger 97) are provided separately from the air outlet 17B.

Pressure caused to be in a low-pressure state by the windshield 17 and the occupant in the spaces 95, 98 at the back of the occupant can be adjusted by directing the pressure adjusting outlets 91B, 92B, 91C, 92C at the back of the occupant and blowing air toward the spaces 95, 98 at the back of the occupant.

The invention is fourthly characterized in that as shown in FIGS. 1, 2 and 8, the second pressure adjusting outlets 101C, 102C, 101D, 102D for adjusting pressure in the spaces 95, 98 around the occupant by blowing air toward the spaces 95, 98 at the backs of the occupant are provided separately from the pressure adjusting outlets 101B, 102B.

Pressure caused to be in a low-pressure state by the windshield 17 and the occupant in the space at the back of the occupant can be adjusted by directing the second pressure adjusting outlets 101C, 102C, 101D, 102D toward the back of the occupant, and by blowing air toward the space at the back of the occupant.

In these embodiments, as shown in FIG. 1, each cross-sectional area of the air inlet 17A and the air outlet 17B of the windshield 17 is fixed, however, the invention is not limited to this and the cross-sectional area of at least either of the air inlet 17A or the air outlet 17B may be also variable according to the vehicle speed of the saddle-type vehicle for example. In addition, as shown in FIG. 8, the outlet for adjusting pressure in the first embodiment and the outlets for adjusting pressure in the third embodiment may be also combined. In this case, pressure can be adjusted in respective spaces and effect can be produced by reducing noise about the rider's ears. In addition, a plurality of the outlets for adjusting pressure in the first to fifth embodiments may be also combined.

While a working example of the present invention has been described above, the present invention is not limited to the working example described above, but various design alterations may be carried out without departing from the present invention as set forth in the claims.

What is claimed is:

1. A windshield and air routing system for a saddle-type vehicle, the vehicle comprising a vehicle body including a leg shield and having a step space behind the leg shield, said windshield system comprising:
   a windshield member having a first air inlet and a first air outlet formed therein, the windshield member comprising:
   an arcuate front panel portion,
   an arcuate rear panel portion spaced apart from the front panel portion,
   a left sidewall interconnecting the front and rear panel portions on the left side of the windshield member, and
   a right sidewall interconnecting the front and rear panel portions on the right side of the windshield member, the first air outlet and the first air inlet communicating with each other through a first duct formed inside of the windshield member between the front and rear panel portions, and a pair of left and right first auxiliary air duct tubes disposed proximate a lower end portion of the windshield member, each of said first auxiliary air duct tubes having an air inlet opening formed at a front end thereof and a respective second air outlet opening formed at a rear end thereof, respectively, and a pair of left and right second auxiliary air duct tubes configured to expel air outwardly toward a space at the rear of the rider or passenger via respective rear pressure-adjusting outlets situated in areas rearward of and proximate the rider or passenger of the vehicle, wherein the rear pressure-adjusting outlets are provided separately from the first and second air outlets;

wherein:

the first air inlet is provided at the front of the vehicle, the first air outlet is disposed between upper ends of the front and rear panel portions of the windshield member, is opened upward at an upper central potion of the windshield member and is configured to direct departing air upwardly from the first duct, the air outlet openings of said left and right auxiliary air duct tubes are operable to adjust pressure in a space around a rider or passenger of the vehicle by blowing out air toward the step space; and the rear pressure-adjusting outlets are operable to adjust pressure in the space at the rear of the rider by blowing out air toward said space.

2. The windshield and air routing system according to claim 1, wherein the first duct is provided with a partition which divides the first duct into an upper duct and a lower duct.

3. The windshield and air routing system according to claim 1, wherein the first air inlet has a first cross-sectional area, the first air outlet has a second cross-sectional area, and wherein the first cross-sectional area is greater than the second cross-sectional area.

\* \* \* \* \*